US009068626B2

(12) United States Patent
Saito et al.

(10) Patent No.: US 9,068,626 B2
(45) Date of Patent: Jun. 30, 2015

(54) BALANCER DEVICE OF INTERNAL COMBUSTION ENGINE

(71) Applicant: HITACHI AUTOMOTIVE SYSTEMS, LTD., Hitachinaka-shi, Ibaraki (JP)

(72) Inventors: Masaharu Saito, Atsugi (JP); Tamotsu Todo, Atsugi (JP); Masaharu Kitamura, Atsugi (JP); Harunobu Okabe, Sagamihara (JP); Seiji Tsuruta, Atsugi (JP); Takashi Hirano, Novi, MI (US)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 0 days.

(21) Appl. No.: 14/148,120

(22) Filed: Jan. 6, 2014

(65) Prior Publication Data

US 2014/0190442 A1     Jul. 10, 2014

(30) Foreign Application Priority Data

Jan. 9, 2013    (JP) ................................. 2013-001633

(51) Int. Cl.
```
F16H 55/18      (2006.01)
G05G 1/00       (2008.04)
F02B 75/06      (2006.01)
F01L 1/00       (2006.01)
F16F 15/26      (2006.01)
```

(52) U.S. Cl.
CPC ............... *F16F 15/264* (2013.01); *F16H 55/18* (2013.01)

(58) Field of Classification Search
CPC ..... F16F 15/265; F16F 15/264; F16F 15/267; F16F 15/12; F16H 61/662; F16H 55/17; F16H 57/0006

USPC .......... 123/192.2, 90.21; 74/579 R, 589, 590, 74/591, 603; 464/180

See application file for complete search history.

(56) References Cited

U.S. PATENT DOCUMENTS

| | | | | | |
|---|---|---|---|---|---|
| 1,852,538 | A | * | 4/1932 | Peterson | 74/443 |
| 1,852,789 | A | * | 4/1932 | Peterson | 74/443 |
| 3,307,419 | A | * | 3/1967 | Brickett et al. | 74/443 |
| 3,667,317 | A | * | 6/1972 | Hillingrathner | 74/604 |
| 4,317,388 | A | * | 3/1982 | Wojcikowski | 74/574.2 |

(Continued)

FOREIGN PATENT DOCUMENTS

| | | | | |
|---|---|---|---|---|
| DE | 102006012861 A1 | * | 9/2007 | F16H 55/17 |
| EP | 1529976 A1 | * | 5/2005 | F16C 35/077 |
| JP | 2007-239521 A | | 9/2007 | |

*Primary Examiner* — Marguerite McMahon
*Assistant Examiner* — Tea Holbrook
(74) *Attorney, Agent, or Firm* — Foley & Lardner LLP

(57) ABSTRACT

A balancer device of an internal combustion engine, has a drive gear engaged with an input gear to which a rotation force is transmitted from a crankshaft; a balancer drive shaft to which the rotation force is transmitted from the drive gear and which has a balancer weight; a balancer drive gear rotating integrally with the balancer drive shaft; a balancer driven gear engaged with the balancer drive gear; and a balancer driven shaft rotating integrally with the balancer driven gear and having a balancer weight. At least one of the drive gear, the balancer drive gear and the balancer driven gear is provided, on both axial direction side surfaces thereof, with ring-shaped grooves whose diameters are different from each other. The ring-shaped grooves are formed up to a depth from the surface of the gear at which both the ring-shaped grooves overlap each other in the axial direction.

10 Claims, 6 Drawing Sheets

(56) References Cited

U.S. PATENT DOCUMENTS

| | | | |
|---|---|---|---|
| 6,626,139 B1 * | 9/2003 | Horita et al. | 123/192.2 |
| 6,755,094 B2 * | 6/2004 | Rehle et al. | 74/443 |
| 7,506,558 B2 * | 3/2009 | Haga et al. | 74/331 |
| 7,510,464 B2 * | 3/2009 | Stierle et al. | 451/343 |
| 8,590,509 B2 * | 11/2013 | Yano et al. | 123/363 |
| 2006/0123942 A1 * | 6/2006 | Facciolla | 74/443 |
| 2010/0294064 A1 * | 11/2010 | Seko | 74/434 |
| 2012/0055447 A1 * | 3/2012 | Yano et al. | 123/400 |

* cited by examiner

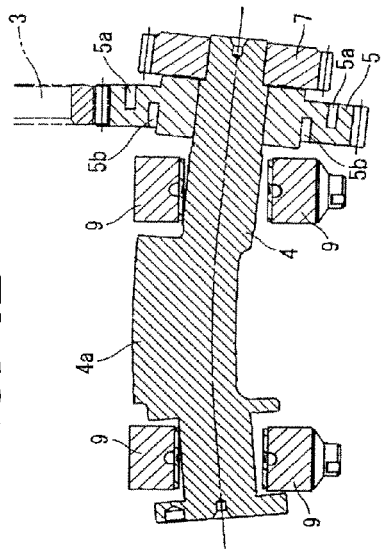
FIG. 4A
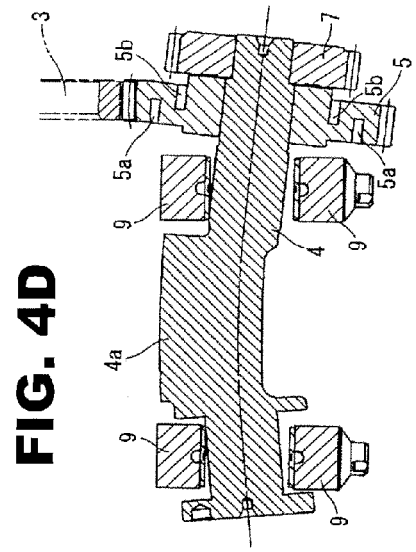
FIG. 4B
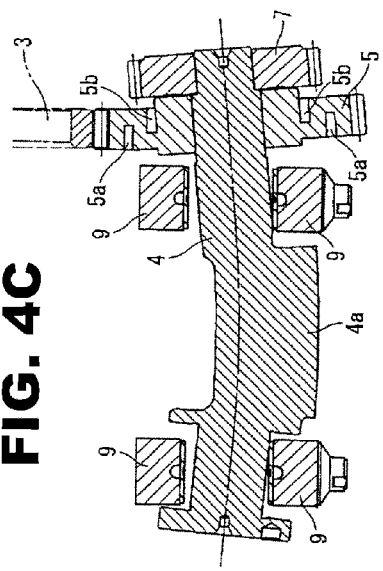
FIG. 4C
FIG. 4D

BALANCER DEVICE OF INTERNAL COMBUSTION ENGINE

BACKGROUND OF THE INVENTION

The present invention relates to a balancer device that is provided at an internal combustion engine and reduces vibration due to rotation of the internal combustion engine.

The balancer device is configured so that rotation is transmitted to a balancer shaft from a crank gear provided at a crankshaft through a driven gear. However, since the crankshaft and the balancer device are supported by different structures, misalignment or error (deviation) tends to occur in positions where each of the crankshaft and the balancer device is supported, and there arises a problem of generating rattling noise (tooth striking noise).

To resolve such problem, Japanese Patent Provisional Publication No. 2007-239521 (hereinafter is referred to as "JP2007-239521") discloses a method for reducing the rattling noise (the tooth striking noise) by absorbing backlash using a scissors gear for the driven gear.

SUMMARY OF THE INVENTION

JP2007-239521, however uses the high-priced scissors gear in comparison with a normal gear, cost of the balancer device therefore increases. Further, using the scissors gear carries a complicated work to engage the gears.

It is therefore an object of the present invention to provide a balancer device of the internal combustion engine, which is capable of reducing the rattling noise (the tooth striking noise) without using the scissors gear.

According to one aspect of the present invention, a balancer device of an internal combustion engine, comprises: a drive gear that is engaged with an input gear to which a rotation force is transmitted from a crankshaft; a balancer drive shaft to which the rotation force is transmitted from the drive gear, the balancer drive shaft having a balancer weight; a balancer drive gear that is provided so as to rotate integrally with the balancer drive shaft; a balancer driven gear that is engaged with the balancer drive gear; and a balancer driven shaft that is provided so as to rotate integrally with the balancer driven gear, the balancer driven shaft having a balancer weight. And at least one of the drive gear, the balancer drive gear and the balancer driven gear is provided, on both axial direction side surfaces thereof, with ring-shaped grooves whose diameters are different from each other. And the ring-shaped grooves are formed up to a depth from the surface of the gear at which both the ring-shaped grooves overlap each other in the axial direction.

According to another aspect of the present invention, a balancer device of an internal combustion engine, comprises: a drive gear that is engaged with an input gear to which a rotation force is transmitted from a crankshaft; a balancer drive shaft to which the rotation force is transmitted from the drive gear, the balancer drive shaft having a balancer weight; a balancer drive gear that is provided so as to rotate integrally with the balancer drive shaft; a balancer driven gear that is engaged with the balancer drive gear; and a balancer driven shaft that is provided so as to rotate integrally with the balancer driven gear, the balancer driven shaft having a balancer weight. And at least one of the drive gear, the balancer drive gear and the balancer driven gear is provided, on both axial direction side surfaces thereof, with ring-shaped grooves whose diameters are different from each other. And at least one of the ring-shaped grooves is present in any axial direction position from one of the both side surfaces of the gear to the other side surface of the gear.

The other objects and features of this invention will become understood from the following description with reference to the accompanying drawings.

BRIEF DESCRIPTION OF THE DRAWINGS

FIGS. 4A to 4D are drawings showing flexure or deformation of a balancer drive shaft and a balancer drive gear.

DETAILED DESCRIPTION OF THE INVENTION

According to the present invention, it is possible to reduce the rattling noise (the tooth striking noise) without using the scissors gear.

Embodiments 1 to 8 of a balancer device of the present invention will be explained below with reference to the drawings (FIGS. 1 to 11).

Embodiment 1

Figure 1:
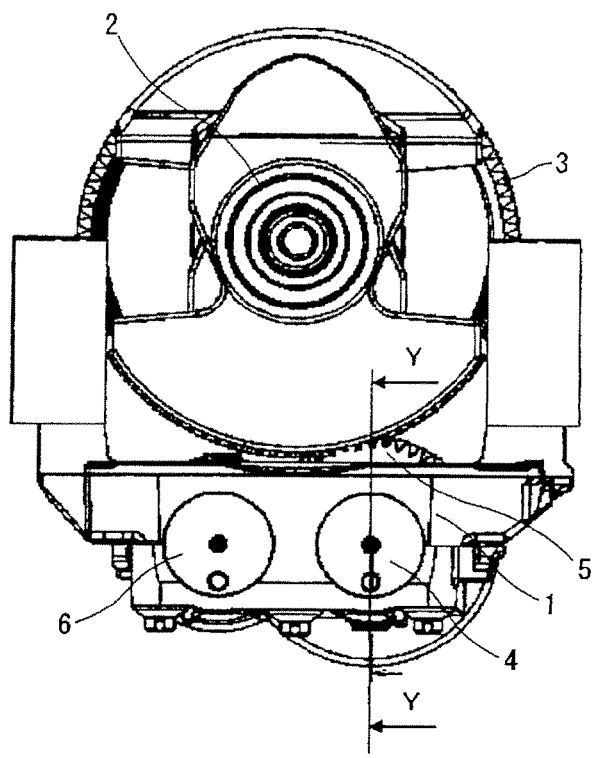
FIG. 1 is a front view of a balancer device.
Figure 2:
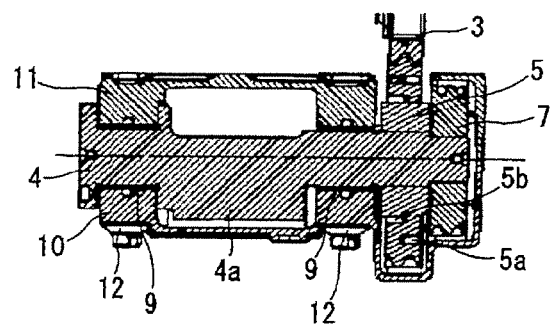
FIG. 2 is a sectional view, taken along a Y-Y line of FIG. 1, of the balancer device.
Figure 3:
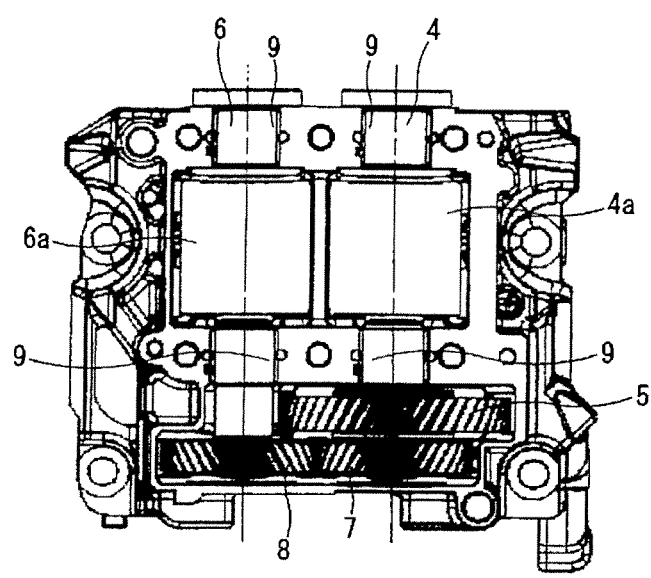
FIG. 3 is a drawing when viewing a housing unit from its bottom with a lower housing removed.

FIG. 1 is a front view of the balancer device mounted in an engine. FIG. 2 is a sectional view, taken along a Y-Y line of FIG. 1, of the balancer device. FIG. 3 is a drawing when viewing a housing unit from its bottom with a lower housing removed.

As shown in FIG. 1, a balancer device 1, which is rotated and driven by a crank gear 3 that is fixed to a crankshaft 2, is provided on a lower surface of a cylinder block (not shown) of the internal combustion engine.

As shown in FIGS. 1 to 3, the balancer device 1 has a main gear (a drive gear) 5 to which a rotation force from the crank gear (an input gear) 3 is transmitted by being engaged with the crank gear 3, a balancer drive shaft 4 to which a rotation force from the main gear 5 is transmitted, a balancer drive gear 7 which is fixed to the balancer drive shaft 4, a balancer driven gear 8, each tooth of which is engaged with each tooth of the balancer drive gear 7, and a balancer driven shaft 6 to which a rotation force from the balancer driven gear 8 is transmitted.

The balancer drive shaft 4 has a semicircular balancer weight 4a that is formed integrally with the balancer drive shaft 4. The balancer driven shaft 6 has a semicircular balancer weight 6a that is formed integrally with the balancer driven shaft 6. The balancer drive shaft 4 and the balancer driven shaft 6 are arrange parallel to each other in a fore-and-aft direction of the engine. Here, both the balancer drive shaft 4 and the balancer driven shaft 6 are configured to rotate twice when the crankshaft 2 rotates once.

The balancer drive shaft 4 and the balancer driven shaft 6 are rotatably supported by a lower housing 10 and an upper housing 11 through slide bearings 9. These lower housing 10 and upper housing 11 are joined to each other with bolts 12.

The crank gear 3, the main gear 5, the balancer drive gear 7 and the balancer driven gear 8 are formed into a disc shape, and each of them has, in the middle thereof, an insertion hole into which the crankshaft 2, the balancer drive shaft 4, the balancer drive shaft 4 and the balancer driven shaft 6 are inserted.

Each of the crank gear 3, the main gear 5, the balancer drive gear 7 and the balancer driven gear 8 has, at an outer periphery thereof, a plurality of helical teeth that are formed integrally with each gear and have a torsion angle of a predetermined angle to an axial direction.

The balancer device 1 of the present invention is configured so that when the crankshaft 2 rotates, the crank gear 3 fixed to the crankshaft 2 rotates in synchronization with the rotation of the crankshaft 2. More specifically, at this time, a rotation driving force is transmitted from the crank gear 3 to the main gear 5 that is fixed to the balancer drive shaft 4, then the balancer drive shaft 4 having the balancer weight 4a, the balancer drive gear 7, the balancer driven gear 8 and the balancer driven shaft 6 having the balancer weight 6a are rotated.

The balancer device 1 of the present invention is configured to generate an exciting force (or a vibratory force) that has an opposite phase to a secondary component of an engine exciting force (or an engine vibratory force) by the balancer drive shaft 4 and the balancer driven shaft 6 having the balancer weights 4a and 6a respectively and rotating double the rotation of the engine then to cancel the vibrations of the engine.

Here, in the balancer device 1 of the present invention, as shown in FIG. 2 (also FIGS. 4A to 4D), ring-shaped grooves 5a and 5b whose diameters are different from each other are provided on both axial direction side surfaces of the main gear 5 that is engaged with the crank gear 3. These ring-shaped grooves 5a and 5b are formed up to a depth from the surface of the main gear 5 at which both ring-shaped grooves 5a and 5b overlap each other in the axial direction.

In general, in the balancer device, due to rotation variation of the crankshaft 2, impact vibrations are generated between the crank gear 3 and the main gear 5.

Further, since the balancer drive shaft 4 is provided with the balancer weight 4a, the balancer drive shaft 4 rotates while the balancer drive shaft 4 itself is being deformed or curved arcuately. For this reason, there is a case where the main gear 5 fixed to the balancer drive shaft 4 will also tilt. Furthermore, since the crankshaft 2 is supported by a different structure from the balancer device 1, misalignment or deviation of position between the crank gear 3 fixed to the crankshaft 2 and the main gear 5 occurs. Because of this, rattling noise (tooth striking noise) tends to be generated at an engagement portion between the crank gear 3 and the main gear 5.

Vibrations due to the rotation variation and/or the rattling noise (the tooth striking noise) are transmitted to the main gear 5, the balancer drive shaft 4, the lower housing 10 and the upper housing 11 through the slide bearings 9, and this creates unusual noises.

However, since the main gear 5 of the balancer device 1 of the embodiment 1 is provided with the ring-shaped grooves 5a and 5b, the vibrations generated between the crank gear 3 and the main gear 5 are absorbed by the ring-shaped grooves 5a and 5b. As a consequence, transmission of the vibrations from a tooth surface to an inner circumferential side of the main gear 5 is suppressed, thereby improving noise/vibration performance (or noise/vibration characteristics).

Further, even if the balancer drive shaft 4 is deformed by the balancer weight 4a, since the ring-shaped grooves 5a and 5b are formed at the main gear 5, rigidity of the main gear 5 is lowered and the main gear 5 is easily warped or curved. Thus, the tooth surface of the main gear 5 can be fitted to a tooth surface of the crank gear 3. Consequently, the present embodiment 1 can gain an effect of suppressing the rattling noise (the tooth striking noise) to a minimum.

As explained above, unlike the related art balancer device that uses the scissors gear in order to improve the noise/vibration performance, since the balancer device 1 of the present embodiment 1 uses no scissors gear, this brings about reduction in cost and simplification of assembling work.

In addition, since both the ring-shaped grooves 5a and 5b overlap each other in the axial direction, at least one of the ring-shaped grooves 5a and 5b is present in any axial direction position from one of the both side surfaces to the other side surface of the main gear 5. Thus, the transmission of the vibrations from the tooth surface to the inner circumferential side of the main gear 5 can be effectively suppressed.

Moreover, since both the ring-shaped grooves 5a and 5b overlap each other in the axial direction, the rigidity of the main gear 5 is lowered and the main gear 5 is easily warped or curved. As a consequence, a contact area of the helical teeth between the crank gear 3 and the main gear 5 becomes large, and good engagement between the crank gear 3 and the main gear 5 can be achieved. It is therefore possible to suppress the rattling noise (the tooth striking noise) more effectively.

Furthermore, in the case where the scissors gear is used, it is possible to reduce the rattling noise (the tooth striking noise). However, due to the fact that friction between the gears becomes great, engagement noise of the gears becomes great. That is, in the related art, there is a trade-off between the suppression of the rattling noise (the tooth striking noise) and suppression of the engagement noise, and it is impossible to suppress both of the rattling noise (the tooth striking noise) and the engagement noise.

In contrast to this, in the embodiment 1, since the transmission of the vibrations from the tooth surface to the inner circumferential side of the main gear 5 can be interrupted or blocked by the ring-shaped grooves 5a and 5b overlapping each other, it is possible to suppress both of the rattling noise (the tooth striking noise) and the engagement noise.

Here, in FIG. 2, as an example, the small diameter ring-shaped groove 5b is formed on the surface of the main gear 5 on an axial direction balancer weight 4a side, while the large diameter ring-shaped groove 5a is formed on the surface of the main gear 5 on an axial direction balancer drive gear 7 side. However, the small diameter ring-shaped groove 5b could be formed on the surface of the main gear 5 on the axial direction balancer drive gear 7 side, and the large diameter ring-shaped groove 5a could be formed on the surface of the main gear 5 on the axial direction balancer weight 4a side. In the following description, effects of each case will be explained.

FIGS. 4A to 4D are drawings showing flexure or deformation of the balancer drive shaft 4 and the balancer drive gear 7.

In FIGS. 4A and 4B, the small diameter ring-shaped groove 5b is formed on the surface of the main gear 5 on the axial direction balancer weight 4a side, and the large diameter ring-shaped groove 5a is formed on the surface of the main gear 5 on the axial direction balancer drive gear 7 side.

In FIGS. 4C and 4D, the large diameter ring-shaped groove 5a is formed on the surface of the main gear 5 on the axial direction balancer weight 4a side, and the small diameter ring-shaped groove 5b is formed on the surface of the main gear 5 on the axial direction balancer drive gear 7 side.

As mentioned above, since the balancer drive shaft 4 is provided with the balancer weight 4a, the balancer drive shaft 4 rotates while the balancer drive shaft 4 itself is being deformed or curved arcuately. FIG. 4A shows a case where an axial direction middle portion of the balancer drive shaft 4 where the balancer weight 4a is formed is deformed or curved downward and both axial direction end portions of the balancer drive shaft 4 are deformed or curved upward.

FIG. 4B shows a case where the axial direction middle portion of the balancer drive shaft 4 where the balancer weight 4a is formed is deformed or curved upward and both axial direction end portions of the balancer drive shaft 4 are deformed or curved downward.

At a time of the case of FIG. 4A, since both axial direction end portions of the balancer drive shaft 4 are curved upward, the outer periphery of the main gear 5 is brought into close proximity with the crank gear 3. On the other hand, at a time of the case of FIG. 4B, since both axial direction end portions of the balancer drive shaft 4 are curved downward, the outer periphery of the main gear 5 separates or moves away from the crank gear 3. Especially the outer periphery of the main gear 5 at the axial direction balancer drive gear 7 side separates or moves away from the crank gear 3.

When comparing the cases of FIG. 4A and FIG. 4B, in the case of FIG. 4B, since the main gear 5 separates from the crank gear 3, backlash becomes great, and the rattling noise (the tooth striking noise) becomes great due to this backlash. Thus, in order to reduce the rattling noise (the tooth striking noise), it is required that the backlash of the outer periphery of the main gear 5 at the balancer drive gear 7 side at the time of FIG. 4B should be reduced.

As described above, in the cases of FIG. 4A and FIG. 4B, since the small diameter ring-shaped groove 5b is formed on the surface of the main gear 5 on the axial direction balancer weight 4a side, an outer peripheral side of the main gear 5 is easily warped or deformed to the balancer weight 4a side. When the outer peripheral side of the main gear 5 is deformed to the balancer weight 4a side, the outer periphery of the main gear 5 at the balancer drive gear 7 side is brought into close proximity with the crank gear 3 side. Therefore, in the case where the small diameter ring-shaped groove 5b is formed on the surface of the main gear 5 on the axial direction balancer weight 4a side, the backlash between the outer periphery of the main gear 5 at the balancer drive gear 7 side and the crank gear 3 can be absorbed, and it is possible to suppress the rattling noise (the tooth striking noise) more effectively.

On the other hand, FIG. 4C shows a case where the axial direction middle portion of the balancer drive shaft 4 where the balancer weight 4a is formed is deformed or curved downward and both axial direction end portions of the balancer drive shaft 4 are deformed or curved upward.

FIG. 4D shows a case where the axial direction middle portion of the balancer drive shaft 4 where the balancer weight 4a is formed is deformed or curved upward and both axial direction end portions of the balancer drive shaft 4 are deformed or curved downward.

At a time of the case of FIG. 4C, since both axial direction end portions of the balancer drive shaft 4 are curved upward, the outer periphery of the main gear 5 is brought into close proximity with the crank gear 3. Especially the outer periphery of the main gear 5 at the balancer drive gear 7 side is brought into close proximity with the crank gear 3. On the other hand, at a time of the case of FIG. 4D, since both axial direction end portions of the balancer drive shaft 4 are curved downward, the outer periphery of the main gear 5 separates or moves away from the crank gear 3.

When comparing the cases of FIG. 4C and FIG. 4D, in the case of FIG. 4C, since the main gear 5 is close to the crank gear 3, the friction between the gears becomes great and the engagement noise of the gears becomes great. Thus, in order to reduce the engagement noise, it is required that the friction between the outer periphery of the main gear 5 at the balancer drive gear 7 side and the crank gear 3 at the time of FIG. 4C should be reduced.

As described above, in the cases of FIG. 4C and FIG. 4D, since the small diameter ring-shaped groove 5b is formed on the surface of the main gear 5 on the balancer drive gear 7 side, the outer peripheral side of the main gear 5 is easily warped or deformed to the balancer drive gear 7 side. When the outer peripheral side of the main gear 5 is deformed to the balancer drive gear 7 side, the outer periphery of the main gear 5 at the balancer drive gear 7 side separates or moves away from the crank gear 3. Therefore, in the case where the small diameter ring-shaped groove 5b is formed on the surface of the main gear 5 on the balancer drive gear 7 side, the friction between the outer periphery of the main gear 5 at the balancer drive gear 7 side and the crank gear 3 can be reduced, and it is possible to suppress the engagement noise more effectively.

Embodiment 2

Figure 5:
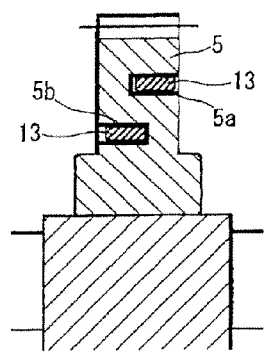
FIG. 5 is a sectional view of a main gear according to an embodiment 2.

FIG. 5 is a sectional view of the main gear 5 of the balancer device 1 according to an embodiment 2. In the following embodiments, components or structures except the ring-shaped grooves 5a and 5b of the main gear 5 are the same as those of the embodiment 1, therefore their explanations will be omitted here.

As shown in FIG. 5, in the embodiment 2, elastic members 13 that have the substantially same shape as the ring-shaped grooves 5a and 5b are inserted in the ring-shaped grooves 5a and 5b so that an elastic force or an expansive force of the elastic members 13 acts on inner and outer circumferences of the ring-shaped grooves 5a and 5b. The elastic member 13 is formed from material that absorbs the vibrations such as rubber and resin or damping steel.

According to the balancer device 1 of the present embodiment 2, as compared with the embodiment 1, since the elastic member 13 absorbs the vibrations which are sources of the noise and suppresses the transmission of the vibrations, the noise/vibration performance can be further improved.

Embodiment 3

Figure 6:
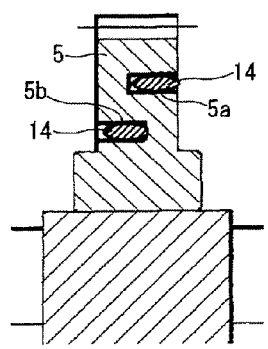
FIG. 6 is a sectional view of a main gear according to an embodiment 3.

FIG. 6 is a sectional view of the main gear 5 of the balancer device 1 according to an embodiment 3. As shown in FIG. 6, in the embodiment 3, instead of the elastic member 13 of the embodiment 2, O-rings 14 which are low-priced vibration absorbing members are inserted in the ring-shaped grooves 5a and 5b so that an elastic force or an expansive force of the O-rings 14 acts on the inner and the outer circumferences of the ring-shaped grooves 5a and 5b.

According to the balancer device 1 of the present embodiment 3, as same as the embodiment 2, since the O-ring 14 absorbs the vibrations which are sources of the noise and suppresses the transmission of the vibrations, the noise/vibration performance can be further improved. Further, by using the low-priced O-ring 14 as the vibration absorbing member, it is possible to reduce the cost.

Embodiment 4

Figure 7:
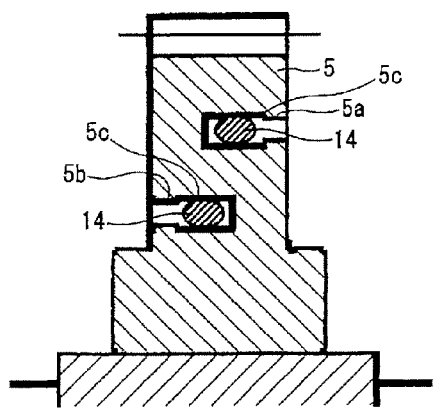
FIG. 7 is a sectional view of a main gear according to an embodiment 4.

FIG. 7 is a sectional view of the main gear 5 of the balancer device 1 according to an embodiment 4. As shown in FIG. 7, in the embodiment 4, a step 5c is formed in each of the ring-shaped grooves 5a and 5b so that a width of an opening of the ring-shaped groove is narrower than a width of a bottom of the ring-shaped groove.

In a case where the elastic member 13 or the O-ring 14 is inserted in the ring-shaped grooves 5a and 5b, the elastic member 13 or the O-ring 14 is compressed by the opening of the ring-shaped groove when being inserted from this narrow opening, and the elastic member 13 or the O-ring 14 returns from the compressed shape when being inserted up to the bottom of the ring-shaped groove. At this time, a shape of the elastic member 13 or the O-ring 14 becomes an optimal compressed shape.

According to the balancer device 1 of the present embodiment 4, in addition to the effects of the embodiments 2 and 3, it is possible to suppress coming-off of the elastic member 13 or the O-ring 14 from the ring-shaped grooves 5a and 5b.

Embodiment 5

Figure 8:
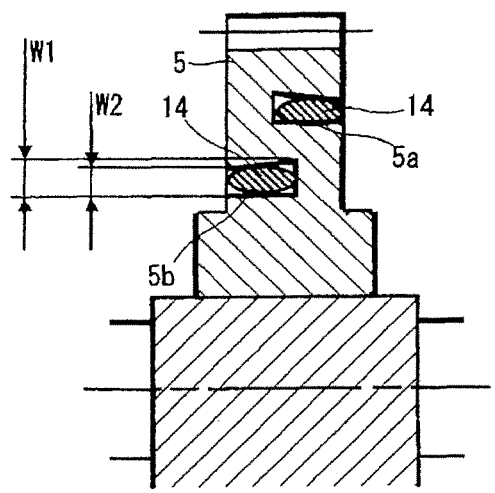
FIG. 8 is a sectional view of a main gear according to an embodiment 5.

FIG. 8 is a sectional view of the main gear 5 of the balancer device 1 according to an embodiment 5. As shown in FIG. 8, in the embodiment 5, at least one of inner and outer circumference surfaces of each of the ring-shaped grooves 5a and 5b tapers from the bottom to the opening so that an opening width W2 is narrower than a bottom width W1. Since the opening width W2 is formed to be narrower, as same as the embodiment 4, it is possible to suppress coming-off of the elastic member 13 or the O-ring 14 from the ring-shaped grooves 5a and 5b.

According to the balancer device 1 of the present embodiment 5, as compared with the case where the step 5c is formed in the embodiment 4, by forming the tapered shape, it is possible to easily form the ring-shaped grooves 5a and 5b which can suppress coming-off of the elastic member 13 or the O-ring 14 from the ring-shaped grooves 5a and 5b.

Embodiment 6

Figure 9:
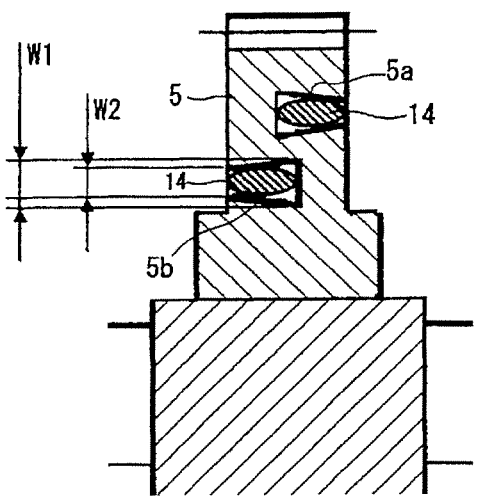
FIG. 9 is a sectional view of a main gear according to an embodiment 6.

FIG. 9 is a sectional view of the main gear 5 of the balancer device 1 according to an embodiment 6. As shown in FIG. 9, in the embodiment 6, both of the inner and outer circumference surfaces of each of the ring-shaped grooves 5a and 5b taper from the bottom to the opening so that the opening width W2 is narrower than the bottom width W1.

According to the balancer device 1 of the present embodiment 6, the same effect as the embodiment 5 can be obtained.

Embodiment 7

Figure 10:
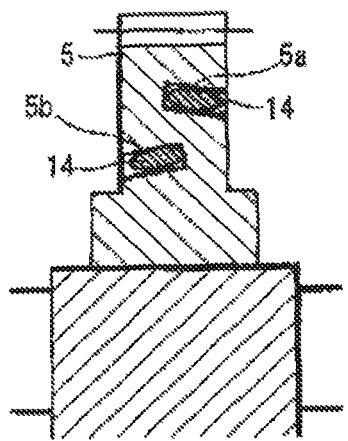
FIG. 10 is a sectional view of a main gear according to an embodiment 7.

FIG. 10 is a sectional view of the main gear 5 of the balancer device 1 according to an embodiment 7. As shown in FIG. 10, in the embodiment 7, each of the ring-shaped grooves 5a and 5b is formed so that the bottom is positioned at the outer peripheral side of the main gear 5 with respect to the opening.

When the main gear 5 rotates, a centrifugal force toward a direction of the outer peripheral side of the main gear 5 acts on the elastic member 13 or the O-ring 14. According to the balancer device 1 of the present embodiment 7, the elastic member 13 or the O-ring 14 is pressed against the bottom of the ring-shaped grooves 5a and 5b by the centrifugal force. Thus, it is possible to suppress coming-off of the elastic member 13 or the O-ring 14 from the ring-shaped grooves 5a and 5b without performing costly special processing such as the tapered shape of the embodiments 5 and 6.

Embodiment 8

Figure 11:
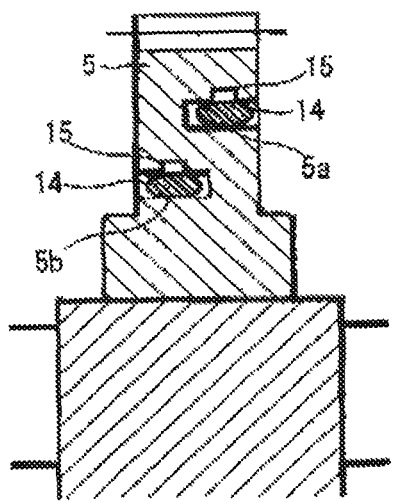
FIG. 11 is a sectional view of a main gear according to an embodiment 8.

FIG. 11 is a sectional view of the main gear 5 of the balancer device 1 according to an embodiment 8. As shown in FIG. 11, in the embodiment 8, a groove 15 whose diameter is larger than each of the outer circumferences of the ring-shaped grooves 5a and 5b is formed in the ring-shaped grooves 5a and 5b.

According to the balancer device 1 of the present embodiment 8, a part of the elastic member 13 or the O-ring 14 is caught in or inserted in the groove 15 by the elastic force or the expansive force of the elastic member 13 or the O-ring 14. It is thus possible to suppress coming-off of the elastic member 13 or the O-ring 14 from the ring-shaped grooves 5a and 5b.

Here, also in a case where a groove 15 whose diameter is smaller than each of the outer circumferences of the ring-shaped grooves 5a and 5b is formed in the ring-shaped grooves 5a and 5b, the same effect can be obtained.

The present invention is not limited to the above embodiments, and the above embodiments can be modified.

For instance, in the embodiments 1 to 8 described above, the balancer device 1 in which the main gear 5 is provided with the ring-shaped grooves 5a and 5b is explained. However, not only the main gear 5, but the balancer drive gear 7 and the balancer driven gear 8 could be also provided with the ring-shaped groove. With these structures of the balancer drive gear 7 and the balancer driven gear 8, noise/vibration performance (noise/vibration characteristics) between the balancer drive gear 7 and the balancer driven gear 8 can be improved.

From the foregoing, the present invention includes the following structure or configuration of the balancer device, and has the following effects.

(1) In the balancer device of the internal combustion engine, an elastic member is provided in the ring-shaped groove.

According to the balancer device of the internal combustion engine, since the elastic member absorbs the vibrations which are sources of the noise and suppresses the transmission of the vibrations, the noise/vibration performance can be further improved.

(2) In the balancer device of the internal combustion engine, the elastic member is rubber material.

According to the balancer device of the internal combustion engine, since the elastic member which is the rubber material absorbs the vibrations which are sources of the noise and suppresses the transmission of the vibrations, the noise/vibration performance can be further improved.

(3) In the balancer device of the internal combustion engine, the elastic member is an O-ring.

According to the balancer device of the internal combustion engine, by using the low-priced O-ring as the vibration absorbing member, it is possible to reduce the cost.

(4) In the balancer device of the internal combustion engine, the ring-shaped groove is formed so that a width of an opening of the ring-shaped groove is narrower than a width of a bottom of the ring-shaped groove.

According to the balancer device of the internal combustion engine, it is possible to suppress coming-off of the elastic member or the O-ring from the ring-shaped groove by the narrow opening.

(5) In the balancer device of the internal combustion engine, the ring-shaped groove tapers from the bottom to the opening so that the opening width is narrower than the bottom width.

According to the balancer device of the internal combustion engine, it is possible to easily form the ring-shaped groove which can suppress coming-off of the elastic member or the O-ring from the ring-shaped groove.

(6) In the balancer device of the internal combustion engine, the ring-shaped groove is formed so that a bottom of the ring-shaped groove is positioned at an outer peripheral side of the drive gear with respect to an opening of the ring-shaped groove.

According to the balancer device of the internal combustion engine, it is possible to suppress coming-off of the elastic member or the O-ring from the ring-shaped groove without performing costly special processing.

(7) In the balancer device of the internal combustion engine, a groove whose diameter is larger or smaller than an outer circumference of the ring-shaped groove is formed in the ring-shaped groove.

According to the balancer device of the internal combustion engine, a part of the elastic member or the O-ring is caught in or inserted in the groove by the elastic force or the expansive force of the elastic member or the O-ring. It is thus possible to suppress coming-off of the elastic member or the O-ring from the ring-shaped groove.

(8) In the balancer device of the internal combustion engine, a large diameter ring-shaped groove is formed on one of the both side surfaces of the drive gear which is on a balancer weight side in an axial direction of the balancer drive shaft, and a small diameter ring-shaped groove is formed on the other side surface of the drive gear.

According to the balancer device of the internal combustion engine, the outer peripheral side of the drive gear is easily warped or deformed to an opposite side to the balancer weight, then it is possible to suppress the engagement noise more effectively.

(9) In the balancer device of the internal combustion engine, a small diameter ring-shaped groove is formed on one of the both side surfaces of the drive gear which is on a balancer weight side in an axial direction of the balancer drive shaft, and a large diameter ring-shaped groove is formed on the other side surface of the drive gear.

According to the balancer device of the internal combustion engine, the outer peripheral side of the drive gear is easily warped or deformed to the balancer weight side, then it is possible to suppress the rattling noise (the tooth striking noise) more effectively.

The entire contents of Japanese Patent Application No. 2013-001633 filed on Jan. 9, 2013 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A balancer device of an internal combustion engine, comprising:
    a drive gear that is engaged with an input gear to which a rotation force is transmitted from a crankshaft;
    a balancer drive shaft to which the rotation force is transmitted from the drive gear, the balancer drive shaft having a balancer weight;
    a balancer drive gear that is provided so as to rotate integrally with the balancer drive shaft;
    a balancer driven gear that is engaged with the balancer drive gear; and
    a balancer driven shaft that is provided so as to rotate integrally with the balancer driven gear, the balancer driven shaft having a balancer weight, and
    at least one of the drive gear, the balancer drive gear and the balancer driven gear being provided, on both axial direction side surfaces thereof, with ring-shaped grooves whose diameters are different from each other, and
    the ring-shaped grooves being formed up to a depth from the surface of the gear at which both the ring-shaped grooves overlap each other in the axial direction.

2. The balancer device of the internal combustion engine as claimed in claim 1, wherein:
    an elastic member is provide in the ring-shaped groove.

3. The balancer device of the internal combustion engine as claimed in claim 2, wherein:
    the elastic member is rubber material.

4. The balancer device of the internal combustion engine as aimed in claim 3, wherein:
    the elastic member is an O-ring.

5. The balancer device of the internal combustion engine as claimed in claim 2, wherein:
    the ring-shaped groove is formed so that a width of an opening of the ring-shaped groove is narrower than a width of a bottom of the ring-shaped groove.

6. The balancer device of the internal combustion engine as claimed in claim 5, wherein:
    the ring-shaped groove tapers from the bottom to the opening so that the opening width is narrower than the bottom width.

7. The balancer device of the internal combustion engine as claimed in claim 2, wherein:
    the ring-shaped groove is formed so that a bottom of the ring-shaped groove is positioned at an outer peripheral side of the drive gear with respect to an opening of the ring-shaped groove.

8. The balance device of the internal combustion engine as claimed in claim 2, wherein:
    another groove, whose diameter is larger or smaller than an outer circumference of the ring-shaped groove, is formed in the ring-shaped groove.

9. The balancer device of the internal combustion engine as claimed in claim 1, wherein:
    a large diameter ring-shaped groove is formed on one of the both side surfaces of the drive gear which is on a balancer weight side in an axial direction of the balancer drive shaft, and
    a small diameter ring-shaped groove is formed on the other side surface of the drive gear.

10. The balancer device of the internal combustion engine as claimed in claim 1, wherein:
    a small diameter ring-shaped groove is formed on one of the both side surfaces of the drive gear which is on a balancer weight side in an axial direction of the balancer drive shaft, and
    a large diameter ring-shaped groove is formed on the other side surface of the drive gear.

* * * * *